(12) United States Patent
Lopez et al.

(10) Patent No.: US 6,831,601 B1
(45) Date of Patent: Dec. 14, 2004

(54) CIRCULAR ARRAY SCANNING WITH SUM AND DIFFERENCE EXCITATION

(75) Inventors: Alfred R. Lopez, Commack, NY (US); Richard J. Kumpfbeck, Huntington, NY (US)

(73) Assignee: BAE Systems Information and Electronic Systems Integration Inc., Greenlawn, NY (US)

( * ) Notice: Subject to any disclaimer, the term of this patent is extended or adjusted under 35 U.S.C. 154(b) by 0 days.

(21) Appl. No.: 10/358,625

(22) Filed: Feb. 5, 2003

(51) Int. Cl.⁷ .............................. H01Q 3/26; G01S 5/02
(52) U.S. Cl. ...................................... 342/374; 342/427
(58) Field of Search ................................. 342/374, 427, 342/373

(56) References Cited

U.S. PATENT DOCUMENTS 3,729,742 A * 4/1973 Boyns ..................... 342/374
3,816,830 A * 6/1974 Giannini .................. 342/374
5,434,575 A * 7/1995 Jelinek et al. ............. 342/365

* cited by examiner

Primary Examiner—Bernarr E. Gregory
Assistant Examiner—Fred H. Mull
(74) Attorney, Agent, or Firm—Kenneth P. Robinson

(57) ABSTRACT

Antennas having a circular array of radiating elements are arranged to enable continuous 360 degree scanning of a sum and difference beam pattern. With a 108 element circular array, a sub array of 27 contiguous elements may be step scanned to 108 positions while maintaining sum and difference antenna patterns. Each scan step may require only two switch adjustments, one to initiate excitation of a contiguous leading element and terminate excitation of the trailing element, and the other to change coupling of a middle element from a divided power port of a left power divider to such a port of a right power divider. Configurations using sub arrays whose element complement is not evenly divisible into the total number of array elements, using sub arrays consisting of an odd number of radiating elements, or employing minimized feed network complexity are disclosed.

30 Claims, 10 Drawing Sheets

SETTINGS FOR 4 OF THE 24 BEAMS

|  | BEAM NUMBER | | | |
| --- | --- | --- | --- | --- |
|  | 1 | 2 | 3 | 4 |
| Channel No. 1 <br> Phase Shifter Setting <br> SP3T Position <br> Element Number | <br> 3 <br> 2 <br> 24 | <br> 2 <br> 2 <br> 24 | <br> 1 <br> 2 <br> 24 | <br> 1 <br> 2 <br> 24 |
| Channel No. 2 <br> Phase Shifter Setting <br> SP3T Position <br> Element Number | <br> 4 <br> 2 <br> 1 | <br> 3 <br> 2 <br> 1 | <br> 2 <br> 2 <br> 1 | <br> 1 <br> 2 <br> 1 |
| Channel No. 3 <br> Phase Shifter Setting <br> SP3T Position <br> Element Number | <br> 4 <br> 1 <br> 18 | <br> 4 <br> 2 <br> 2 | <br> 3 <br> 2 <br> 2 | <br> 2 <br> 2 <br> 2 |
| Channel No. 4 <br> Phase Shifter Setting <br> SP3T Position <br> Element Number | <br> 3 <br> 1 <br> 19 | <br> 4 <br> 1 <br> 19 | <br> 4 <br> 2 <br> 3 | <br> 3 <br> 2 <br> 3 |
| Channel No. 5 <br> Phase Shifter Setting <br> SP3T Position <br> Element Number | <br> 2 <br> 1 <br> 20 | <br> 3 <br> 1 <br> 20 | <br> 4 <br> 1 <br> 20 | <br> 4 <br> 2 <br> 4 |
| Channel No. 6 <br> Phase Shifter Setting <br> SP3T Position <br> Element Number | <br> 1 <br> 1 <br> 21 | <br> 2 <br> 1 <br> 21 | <br> 3 <br> 1 <br> 21 | <br> 4 <br> 1 <br> 21 |
| Channel No. 7 <br> Phase Shifter Setting <br> SP3T Position <br> Element Number | <br> 1 <br> 1 <br> 22 | <br> 1 <br> 1 <br> 22 | <br> 2 <br> 1 <br> 22 | <br> 3 <br> 1 <br> 22 |
| Channel No. 8 <br> Phase Shifter Setting <br> SP3T Position <br> Element Number | <br> 2 <br> 1 <br> 23 | <br> 1 <br> 1 <br> 23 | <br> 1 <br> 1 <br> 23 | <br> 2 <br> 1 <br> 20 |

FIG. 3

SETTINGS FOR 4 OF THE 24 BEAMS

| | BEAM NUMBER | | | |
|---|---|---|---|---|
| | 1 | 2 | 3 | 4 |
| Channel No. 1 | | | | |
|     Phase Shifter Setting | 1 | 2 | 3 | 4 |
|     SP6T Position | 4 | 4 | 4 | 4 |
|     Element Number | 1 | 1 | 1 | 1 |
|     SP2T Position | 1 | 1 | 1 | 1 |
| Channel No. 2 | | | | |
|     Phase Shifter Setting | 4 | 1 | 2 | 3 |
|     SP6T Position | 3 | 4 | 4 | 4 |
|     Element Number | 22 | 2 | 2 | 2 |
|     SP2T Position | 1 | 1 | 1 | 1 |
| Channel No. 3 | | | | |
|     Phase Shifter Setting | 3 | 4 | 1 | 2 |
|     SP6T Position | 3 | 3 | 4 | 4 |
|     Element Number | 23 | 23 | 3 | 3 |
|     SP2T Position | 1 | 1 | 1 | 1 |
| Channel No. 4 | | | | |
|     Phase Shifter Setting | 2 | 3 | 4 | 1 |
|     SP6T Position | 3 | 3 | 3 | 4 |
|     Element Number | 24 | 24 | 24 | 4 |
|     SP2T Position | 1 | 1 | 1 | 1 |
| Channel No. 5 | | | | |
|     Phase Shifter Setting | 4 | 3 | 2 | 1 |
|     SP6T Position | 5 | 5 | 5 | 5 |
|     Element Number | 5 | 5 | 5 | 5 |
|     SP2T Position | 2 | 2 | 2 | 2 |
| Channel No. 6 | | | | |
|     Phase Shifter Setting | 1 | 4 | 3 | 2 |
|     SP6T Position | 4 | 5 | 5 | 5 |
|     Element Number | 2 | 6 | 6 | 6 |
|     SP2T Position | 2 | 2 | 2 | 2 |
| Channel No. 7 | | | | |
|     Phase Shifter Setting | 2 | 1 | 4 | 3 |
|     SP6T Position | 4 | 4 | 5 | 5 |
|     Element Number | 3 | 3 | 7 | 7 |
|     SP2T Position | 2 | 2 | 2 | 2 |
| Channel No. 8 | | | | |
|     Phase Shifter Setting | 3 | 2 | 1 | 4 |
|     SP6T Position | 4 | 4 | 4 | 5 |
|     Element Number | 4 | 4 | 4 | 8 |
|     SP2T Position | 2 | 2 | 2 | 2 |

FIG. 5

| Number of Excited Array Elements | Number and Type of Power Dividers | Number and Type of Power Divider Switches |
|---|---|---|
| 54 | 2 27-Way | 54 SP4T |
| 36 | 2 18-Way | 36 SP6T |
| 18 | 2 9-Way | 18 SP12T |
| 12 | 2 6-Way | 12 2P18T |
| 6 | 2 3-Way | 6 SP36T |
| 4 | 2 2-Way | 4 SP54T |
| 2 | 2 1-Way | 2 SP108T |

| Power Divider Switch Number | | | | | | | | | | | | | | | | | | | | | | | | | | | |
|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| Radiating Element Number | | | | | | | | | | | | | | | | | | | | | | | | | | | |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
| 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 |
| 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 |
| 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 |
| 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98 |
| 85 | 86 | 87 | 88 | 89 | 90 | 91 | 92 | 93 | 94 | 95 | 96 | 97 | 98 | 99 | 100 | 101 | 102 | 103 | 104 | 105 | 106 | 107 | 108 | 1 | 2 | 3 | 4 |
| 99 | 100 | 101 | 102 | 103 | 104 | 105 | 106 | 107 | 108 | 1 | 2 | 3 | 4 | 5 | 6 | 7 | 8 | 9 | 10 | 11 | 12 | 13 | 14 | 15 | 16 | 17 | 18 |
| 5 | 6 | 7 | 8 | 9 | 10 | 11 | 12 | 13 | | | | | | | | | | | | | | | | | | | |
| Switch Positions at Start and Fly-Back Positions | | | | | | | | | | | | | | | | | | | | | | | | | | | |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| | | | | | | | | | 108 | 1 | 2 | 3 | 4 | 5 | 6 | 7 | 8 | 9 | 10 | 11 | 12 | 13 | 14 | 15 | 16 | 17 | 18 |
| Switch Positions Prior to Fly-Back Positions | | | | | | | | | | | | | | | | | | | | | | | | | | | |
| | | | | | | | | | | | | 13 | 14 | 15 | 16 | 17 | 18 | 19 | 20 | 21 | 22 | 23 | 24 | 25 | 26 | 27 | |
| 5 | 6 | 7 | 8 | 9 | 10 | 11 | 12 | 13 | | | | | | | | | | | | | | | | | | | |

FIG. 9

Connections of 27 SP4T Switches

| | SP4T Switch Number | | | | | | | | | | | | | | | | | | | | | | | | | | |
|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| | Radiating Element Number | | | | | | | | | | | | | | | | | | | | | | | | | | |
| 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 |
| 82 | 83 | 84 | 85 | 86 | 87 | 88 | 89 | 90 | 91 | 92 | 93 | 94 | 95 | 96 | 97 | 98 | 99 | 100 | 101 | 102 | 104 | 105 | 106 | 107 | 108 |

FIG. 11

Power Divider to Circular Array Elements Connection

(0 indicates attenuator set for maximum attenuation)

| | Power Divider Connection | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | L | L | L | L | L | L | L | L | L | L | L | L | L | L | O | R | R | R | R | R | R | R | R | R | R | R | R | R |
| Scan Step No. | Circular Array Element Number | | | | | | | | | | | | | | | | | | | | | | | | | | | |
| -1 | 108 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 53 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 |
| 54 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 |
| 55 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 |
| 56 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | 81 | 82 |
| 107 | 107 | 108 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 108 | 108 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| 109 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |

FIG. 12

CIRCULAR ARRAY SCANNING WITH SUM AND DIFFERENCE EXCITATION

RELATED APPLICATIONS (Not Applicable)

FEDERALLY SPONSORED RESEARCH (Not Applicable)

BACKGROUND OF THE INVENTION

This invention relates to antennas and, more particularly, to electronic scanning of a circular array antenna with excitation of a sum and difference beam pattern.

Electronic scanning of a circular array of radiating elements represents a long term problem area in antenna technology, particularly in the context of continuous circular scanning of a composite sum and difference beam pattern. The basic geometry of a circular array and the objective of providing the capability of uninterrupted and continuous scanning (e.g., from zero degrees to 360 degrees azimuth and continuing past 360 degrees) introduce complexities of signal switching and beam management and control. While solutions may have been proposed, no solutions free of operational limitations or of a high level of technical complexity are known.

Accordingly, objects of the present invention are to provide new and improved curved linear array antennas and such antennas having one or more of the following characteristics and capabilities:

- circular arrays with continuously scannable beam patterns;
- scannable sum and difference composite beam patterns;
- stepped scanning of sum and difference beam patterns, with only two switch activations per step;
- circular arrays with simplified switching networks;
- stepped beam patterns formed by progressively modified element sub array;
- circular scanning with a number of sub array elements not evenly divisible into the total array complement; and
- circular scanning with sub arrays having an odd number of elements.

SUMMARY OF THE INVENTION

In accordance with the invention, an array antenna, with scannable beam sum and difference excitation, includes a circular array of radiating elements arranged to provide a beam pattern upon excitation of radiating elements of a sub array consisting of a fixed number of radiating elements of the array. First and second power dividers each have a first port and a plurality of divided power ports. A circuit device, coupled to the first ports of the first and second power dividers, is arranged to provide at a sum port a signal representative of a sum of signals from the power dividers and at a difference port a signal representative of a difference between signals from the power dividers. Switching devices are coupled between the radiating elements and the divided power ports of the first and second power dividers and arranged to provide the beam pattern by coupling the first and second power dividers to respective first left and first right subsets of a sub array of the radiating elements. A control facility is arranged to control the switching devices to scan the beam pattern by coupling the first power divider to a successive left subset of the radiating elements and the second power divider to a successive right subset of the radiating elements. Such successive left subset includes at least one radiating element not included in the first left subset and the successive right subset includes at least one radiating element not included in the first right subset. This switching protocol can then be repeated for continuing 360 degree scanning of the sum and difference pattern.

Also in accordance with the invention, an array antenna, with scannable beam excitation, includes a circular array of radiating elements arranged to provide a beam pattern upon excitation of a sub array consisting of a fixed number of radiating elements of the array and a power divider with a first port and a number of divided power ports equal to that fixed number. Switching devices are coupled between the radiating elements and the power divider and arranged to provide the beam pattern by coupling the power divider to the sub array of the radiating elements. A control facility is arranged to control the switching devices to scan the beam pattern by coupling the power divider to successive sub arrays, each modified from the preceding sub array by initiating coupling to a radiating element contiguous in a forward beam scan direction and terminating coupling to the trailing radiating element of the preceding sub array, to enable continuous 360 degree scanning.

For a better understanding of the invention, together with other and further objects, reference is made to the accompanying drawings and the scope of the invention will be pointed out in the accompanying claims.

BRIEF DESCRIPTION OF THE DRAWINGS

FIG. 3 provides exemplary settings for four of the 24 beam scan positions for an eight element sub array of the FIG. 2 array antenna.

FIG. 5 provides exemplary settings for four of the 24 beam scan positions for an eight element sub array of the FIG. 4 array antenna.

FIG. 9 provides exemplary power divider to radiating element switched interconnections for selections of the 108 beam scan positions of the FIG. 8 array antenna, with fly-back switch positioning at the end of each 360 degree scan cycle.

FIG. 11 provides exemplary switch connection data for switching devices of the FIG. 10 array antenna.

FIG. 12 provides exemplary power divider to radiating element switched interconnections for selections of the 108 beam scan positions of the FIG. 10 array antenna.

DESCRIPTION OF THE INVENTION

The invention relates to scanning the beam of a circular array antenna or, more generally, the beam of an antenna having a linear (e.g., curved) array of radiating elements. More particularly, consideration is directed to circuit aspects of scanning a beam characterized by sum and difference excitation, in the context of a circular array of radiating elements. Such scanning may take the form of progressively stepping the beam to a succession of azimuth positions around a horizontally aligned circular array, of stepping the beam from one azimuth to some other selected azimuth, or of other scanning protocol.

Figure 1:
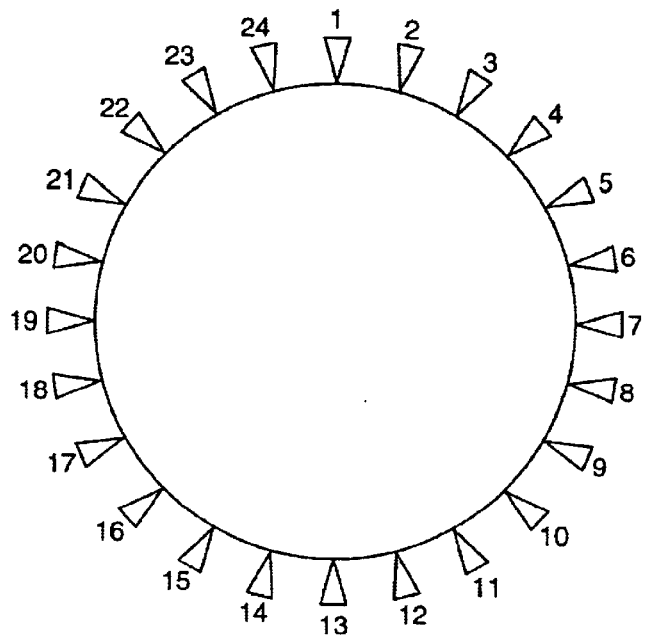
FIG. 1 shows a circular array of radiating elements usable with the invention.

As an aid to understanding, there will first be described the scanning of a simple focused beam which does not involve sum and difference excitation. FIG. 1 shows a circular array 30, including 24 radiating elements 1–24. If the elements are spaced by 0.4 wavelength, at a frequency in an operating frequency range, then the diameter of the FIG. 1 circle in wavelengths will be 9.6 wavelengths.

Figure 2:
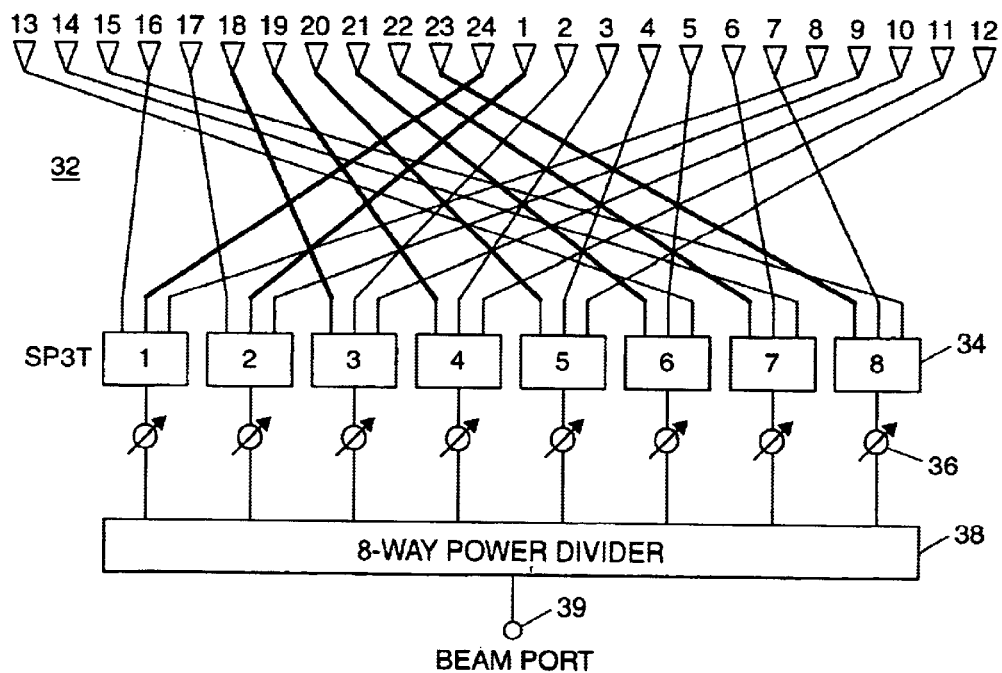
FIG. 2 illustrates a scannable beam array antenna arranged to enable a beam pattern formed by excitation of a sub array of eight radiating elements of the FIG. 1 array to be scanned with 360 degree continuous scanning.

One-third of the 24 elements (e.g., a sub array of any eight contiguous elements) can be excited to provide a focused beam pattern. FIG. 2 shows a switching and phasing configuration arranged to enable excitation of a sub array of any eight contiguous radiating elements of array antenna 32. In FIG. 2 are included eight single-pole triple-throw (SP3T) switching devices, a representative one of which is identified at 34 (the eight SP3T switching devices are shown as units 1–8). These SP3T switching devices are arranged to enable excitation of any eight element sub array to provide a beam pattern at any one of 24 azimuth positions or to rotate the beam by stepping the selection of eight elements to 24 successive eight element sub arrays around the circular array of radiating elements. The term "circular" is defined generically, for present purposes, to include elliptical and other configurations of radiating elements extending 360 degrees around a point.

By way of example, in FIG. 2 the darker couplings to the radiating elements represent excitation of the sub array formed by elements 18–24 and 1. With radiating elements 1–24 of FIG. 2 representing the circular array of FIG. 1, the beam pattern provided by the eight element sub array can be stepped 15 degrees in azimuth clockwise by switching SP3T No.3 from its center port (i.e., its first port) to its center port (i.e., its second port). Thus, the power divider 38 is coupled to a successive sub array modified by initiating coupling to a radiating element contiguous in a forward beam scan direction (element 2) and terminating coupling to the trailing radiating element of the initial sub array (element 18). This stepping process can be continued indefinitely, e.g., by subsequently switching SP3T No.4 from its first port to its second port, etc.

In this configuration, eight phase shifters, a representative one of which is indicated at 36, are provided for use to focus the beam pattern for desired shape in the circular array context. The phase shifters can be adjusted to provide appropriate relative phases of excitation of the radiating elements. In this example of excitation of the initial sub array of elements 18–24 and 1, the center elements 21 and 22 are set for a first phase (i.e., identified as phase value 01), elements 20 and 23 are set to phase value 02, elements 19 and 24 are set to phase value 03 and elements 18 and 1 are set to phase value 04. Determination of the relative phase values and adjustment of the phase shifters to provide these values can be implemented using known techniques to provide relative phasing and beam shaping as appropriate in particular applications.

The nominal beamwidth of the beam pattern for the eight element sub array of this example is 6.9 degrees, with 15 degree separations between the 24 beam positions. The specific settings of the SP3T switching devices and the phase shifters (value 01, 02, 03 or 04) for the elements 18–24 and 1 of the initial sub array (shown as beam number 1) and three successive beam positions are shown by way of example in FIG. 3. For finer adjustment while the beam is at any of the 24 positions, the beam may be scanned or pointed in azimuth (i.e., within its basic 15 degree sector) by superimposing on the phase factors for basic beam focusing, additional phase factors determined to be effective for scanning the beam to a desired pointing alignment within its 15 degree sector. Such additional phase factors can be determined by known beam scan techniques, as appropriate in particular applications. As shown in FIG. 2, this antenna configuration includes an 8-way power divider 38 and an input/output beam port 39. Since antenna elements are typically reciprocal devices, the FIG. 2 antenna may be used for signal reception, signal transmission, or both. For present purposes, a "power divider" is a device having power divider/combiner capabilities, which includes a plurality of divided power ports and a combined power input/output or first port and may comprise one or more units. Not shown in FIG. 2 is a control facility arranged to control settings of the SP3T switching devices and phase shifters to provide settings for selected or predetermined beam scanning. Such a facility with suitable programming, as discussed with reference to FIG. 4, can be provided by skilled persons, once they have an understanding of the antenna configuration and its operation as described.

Figure 4:
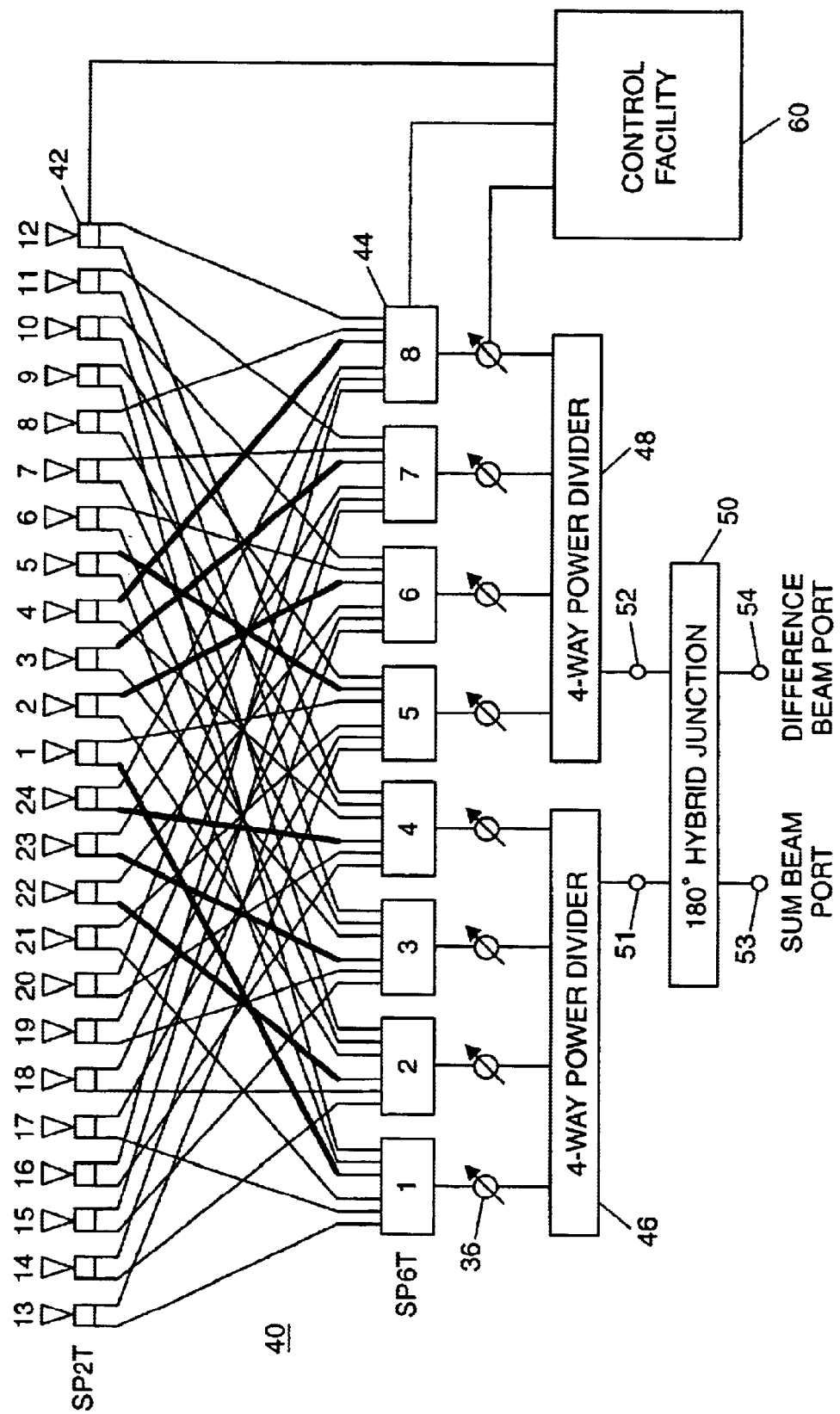
FIG. 4 illustrates a scannable beam array antenna arranged to enable continuous circular scanning of a beam pattern including both sum and difference excitation.
Figures 6, 7:
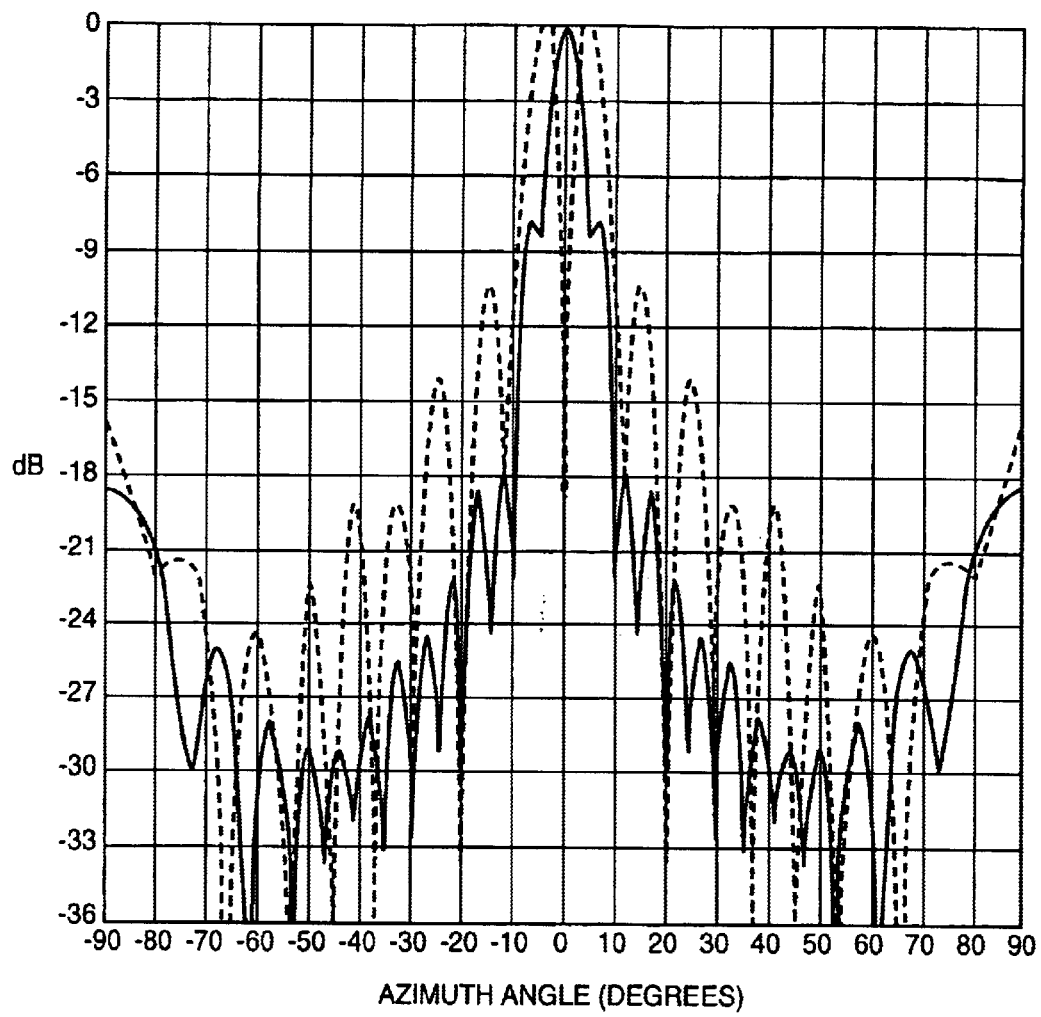
FIG. 6 provides computed sum and difference beam patterns for the eight element scannable beam pattern of the FIG. 3 array antenna.
FIG. 7 provides component data for a FIG. 3 type array antenna using excitation of sub arrays of different numbers of the radiating elements of a 108 element circular array.

Referring now to FIG. 4, there is illustrated an array antenna 40, which provides an electronically scannable beam with simultaneous sum and difference excitation. Thus, the sum excitation provides a beam pattern as discussed with reference to FIG. 2, while the difference excitation provides a beam pattern having a central null. Such patterns are illustrated in FIG. 6 (sum pattern shown solid and difference pattern shown dashed).

Maintaining the null of the difference excitation at the center of the active aperture (the aperture as determined by the selected sub array of radiating elements) is accomplished by certain circuit changes. Thus, the SP3T switching devices, of FIG. 2, are replaced with eight single-pole six-throw (SP6T) switching devices, a representative one of which is identified at 44, and at each radiating element a single-pole double-throw (SP2T) switching device is added, with a representative one thereof identified at 42. As a result, the number of couplings (e.g., interconnecting cables) between the switching devices and the radiating elements (now via the SP2T switching devices) increases by a factor of two.

As illustrated in FIG. 4, for sum and difference excitation of array antenna 40 first and second 4-way power dividers 46 and 48 are provided and the divided power ports of each power divider are coupled to four of the eight SP6T switching devices 42, via the phase shifters 36, as shown. Also included is a four port circuit device 50, shown as a 180 degree hybrid junction, which has first and second ports 51 and 52 respectively coupled to the first and second power dividers 46 and 48, and also includes a sum beam port 53 and a difference beam port 54. For signal reception, circuit device 50 functions in the manner of a known form of hybrid junction, to provide a sum beam port output at 53 representing the result of addition of signals from power dividers 46 and 48 (e.g., providing a beam pattern as shown solid in FIG. 6) and a difference beam port output at 54 representing the result of subtraction of signals from the power dividers (e.g., providing a beam pattern as shown dashed in FIG. 6). In use for signal transmission, an input signal to sum beam port 53 provides a radiated beam pattern similar to that provided by the FIG. 2 array antenna. While a difference beam may also be transmitted, typically, only a sum beam is transmitted.

Operationally, the example of excitation of a radiating element sub array of elements 22–24 and 1–5 is represented by the darker coupling lines in FIG. 4. As shown, the left side elements 22–24 and 1 are excited via power divider 46 and the right side elements 2–5 are excited via power divider 48. In this manner sum and difference excitation are provided in conjunction with circuit device 50, as described. To step the beam pattern on 15 degree increments to the right in FIG. 4, switched port position 4 of SP6T No.2 is selected in order to excite radiating element 2 (in place of radiating element 22, which had been excited via position 3 of SP6T No.2). At the same time, switched portion 5 of SP6T No. 6 is selected in order to excite radiating element 6 switched port position 5 of SP6T No. 6 is selected in order to excite radiating element 6 (in place of radiating element 2, which had been excited via position 4 of SP6T No.6). In this manner, the beam pattern is stepped one interval to the right to excite the sub array of elements 23, 24 and 1–6, while providing excitation of the four right side elements (i.e., now elements 23, 24, 1 and 2) via power divider 48 and excitation of the four left side elements (i.e., now elements 3–6) via power divider 46, to maintain the sum and difference excitation. It should be noted that, with operation as described, a sum and difference beam pattern is stepped from one position to a successive position with activation of only two switching devices (e.g., SPGT Nos.2 and 6).

Thus, by inclusion and operation of the 24 SP2T switching devices, one for each of the 24 radiating elements, each such element may be coupled to either power divider 46 or power divider 48, as appropriate to maintain sum and difference excitation. The specific settings of the SP6T and SP2T switching devices of FIG. 4, as well as the associated basic phase shifter settings, for the 22, 23 and 1–5 element sub array example (shown as beam number 1) and three successive beams are shown by way of example in FIG. 5. By logical continuation of this switching protocol the beam pattern of array antenna 40 of FIG. 4 can be stepped through all 24 beam positions at 15 degree steps, returning to the beam number 1 position and repeated continuously, if desired. It will further be evident, that the beam pattern can be scanned directly to any beam position by selection of the appropriate switching device and phase shifter settings. As discussed above, for more precise beam scanning or steering within a 15 degree sector, while the beam remains at one of the 24 stepped positions, additional phase factors suitable for such scan adjustment or steering of the beam may be superimposed on the phase factors provided for basic beam focusing purposes.

Also included, as an element of array antenna 40 of FIG. 4, is control facility 60, which may be a suitable computer-based processor or other device or apparatus arranged to provide control signals or other indicia effective to control the settings of the SP6T and SP2T switching devices and the phase shifters. While representative couplings are shown from control facility 60 to representative elements 44, 42 and 36, such couplings will typically be provided to each of the switching devices and phase shifters, as appropriate in particular embodiments of array antennas. Suitable control facility configurations and programming may be implemented using known techniques by skilled persons who have an understanding of the invention. Also, with such understanding, appropriate variations of control facility 60 may be implemented for the array antennas of each of the accompanying figures and variations thereof, with changes and adjustments as appropriate to particular embodiments.

With reference to the above description of operation of the FIG. 4 antenna, control facility 60 may be arranged to control the switching devices 42 and 44 to scan the beam pattern (with sum and difference excitation) by coupling the first power divider 46 from a first left subset (e.g., elements 22–24 and 1) to a successive left subset (e.g., elements 23, 24, 1 and 2). For the same beam scan step, the second power divider 48 is coupled from a first right subset (e.g., elements 2–5) to a successive right subset (e.g., elements 3–6). In this manner, each successive left subset includes one radiating element not included in the preceding or initial left subset, and each successive right subset includes one radiating element not included in the preceding or initial right subset. At the same time, the successive sub array of radiating elements, which consists of these left and right subsets also includes one element (e.g., element 2) not included in the preceding or initial sub array and excludes one element (e.g., element 22) which was included in the preceding or initial sub array. In these examples based on stepping the beam pattern of an eight element sub array to successive 15 degree sectors, eight contiguous elements are excited, with the next contiguous element in the beam step direction newly excited (e.g., element 2), excitation of the trailing element terminated (e.g., element 22) and excitation of the other six elements maintained from one sub array to the successive sub array (e.g., elements 23-1). In other implementations different sub array and subset excitation protocols may be employed as appropriate.

FIG. 6 shows computed sum and difference patterns for an example of a circular array antenna of the type shown in FIG. 4. For this example, 108 radiating elements were included with element spacing of 0.4 wavelength and nominal beamwidth of 4.8 degrees. The circular array diameter was 13.75 wavelengths, with switching step size of 3.33 degrees.

FIG. 7 lists data as to complements of power dividers and switching devices for other possible sub arrays usable with a circular array of 108 radiating elements, under the conditions that the sub array consists of an even number of radiating elements and 108 divided by the number of elements in the sub array is an integer. Thus, for example, for an array antenna of a configuration similar to that of FIG. 4, if a sub array size of 18 elements is selected, two 9-way power dividers and 18 single-pole 12-throw (SP12T) switching devices would be employed in a FIG. 4 type configuration. As described for the FIG. 4 antenna, with these antenna configurations, complete 360 degree scan is achieved while requiring the activation of only two switching devices per step.

As described above, a beam pattern is scanned by exciting a sub array of contiguous radiating elements and then exciting a different sub array to point the beam pattern in a new direction. So long as the sub array includes an even number of radiating elements and the total number of elements divided by the number of elements in the sub array is an integer, considerations which arise in the case of non-integer sub array choices are not relevant.

Figure 8:
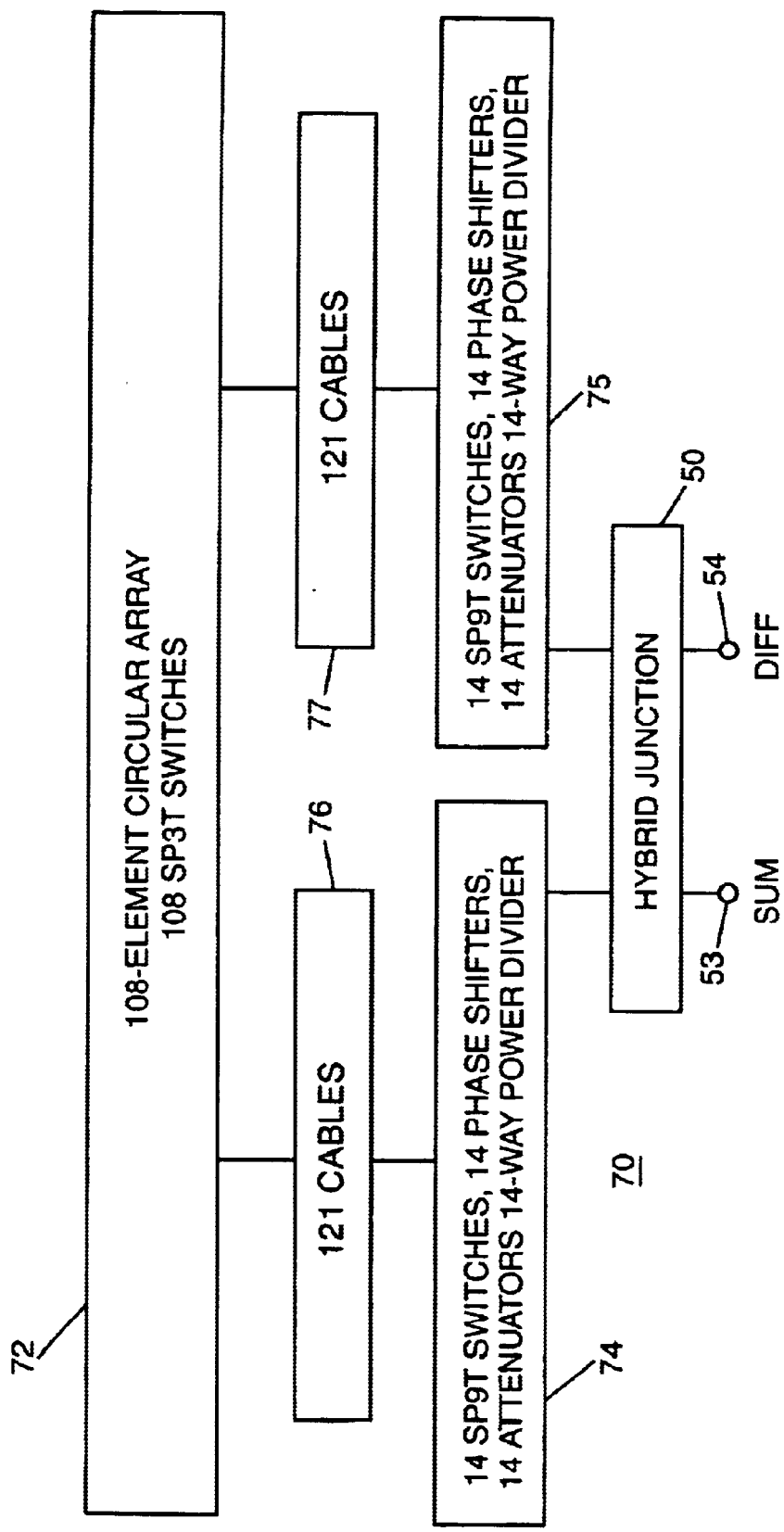
FIG. 8 illustrates an array antenna, with a scannable sum and difference beam pattern, using a sub array of 28 radiating elements which is not evenly divisible into the 108 total number of radiating elements in a circular array.

FIG. 8 illustrates a circular array antenna configuration operable with use of an excited sub array which includes a number of radiating elements such that the total number of elements in the array antenna is not divisible by the number of elements in a sub array without a remainder. Thus, for a 108 element array and a 28 element sub array, 108/28= 3.857.

As shown in FIG. 8, array antenna 70 includes a 108 element circular array, with each element excited via one of 108 single-pole triple-throw (SP3T) switching devices, as represented by box 72. Elements of antenna 70 are generally of the same basic type as elements of antenna 40 of FIG. 4, subject to changes in switching capacity, etc. Thus, while antenna 40 includes power dividers, phase shifters and switching devices shown as discrete elements, such as 46, 36 and 44, similar types of elements are included in boxes 74 and 75 of antenna 70, with the addition of an attenuator associated with each of the 14 power divider ports of each power divider. In this example an attenuator associated with each power divider divided power port provides additional flexibility in relative excitation of the elements of a sub array. Whereas in FIG. 4, the SP6T switching devices associated with each 4-way power divider are coupled to the 24 radiating elements via 24 interconnecting cables, the SP9T switching devices associated with each 14-way power divider of FIG. 8 are coupled to the 108 radiating elements via 121 cables as represented by boxes 76 and 77.

Basically, in the FIG. 8 antenna, the SP3T switching device associated with each radiating element enables operation with overlapping scan (extending beyond 360 degrees) such that after stepping through 108 beam positions (each step involving activation of two switching devices) all switches are activated (termed "fly-back switching") to return the beam pattern and all switching devices to their original position/activation. Thus, fly-back switching can be provided at the end of a scan stepping cycle covering 360 degrees in azimuth, in order to couple the two power dividers to the same radiating elements to which they were respectively coupled at the start of the scan stepping cycle. In this manner, a different switching protocol is employed to provide the 360 degree scanning capability. This is illustrated in FIG. 9, which lists couplings of the 28 SP9T switching devices to the 28 elements of the excited sub array for nine representative beam scan positions, including such couplings for the start and fly-back beam positions and for the scan position prior to the fly-back beam positions. There is thus provided an electronic scan control configuration which enables full 360 degree scanning with use of a sub array which includes a number of sub array elements such that the total number of elements in the array is not evenly divisible by the number of sub array elements.

Figure 10:
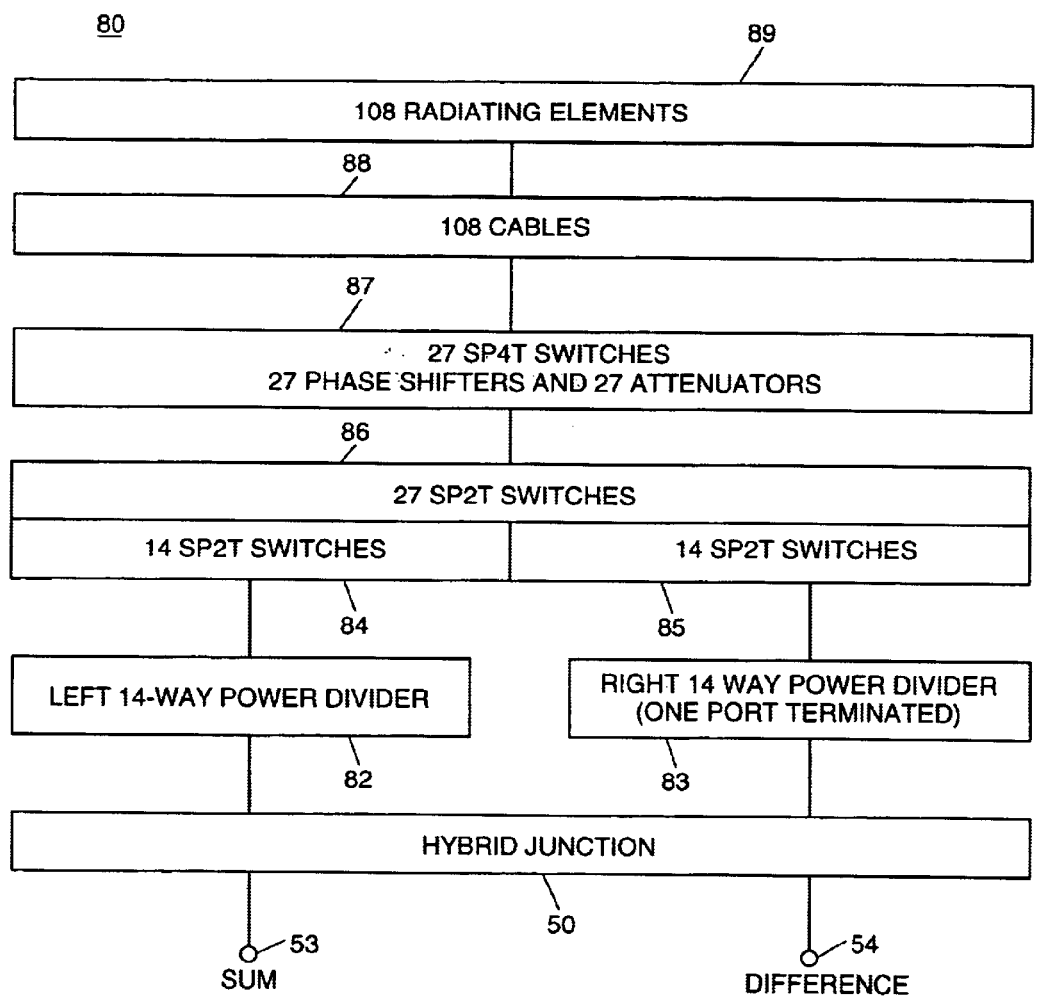
FIG. 10 illustrates an array antenna with a scannable sum and difference beam pattern excited via a simplified switching configuration involving dissipative termination of one divided power port of each power divider.

FIG. 10 illustrates a circular array antenna 80 including 108 radiating elements, wherein a sub array of 27 elements is excited by use of a switching network which is further reduced or minimized as to complexity. Antenna 80 enables a sub array consisting of an odd number of elements to be stepped through 108 beam positions for scanning of a sum and difference beam pattern. In FIG. 10, the combination of two 14-way power dividers 82 and 83, 28 SP2T switching devices represented by boxes 84 and 85 and 27 SP4T switching devices represented by box 87 are arranged as shown, with inclusion of attenuators and phase shifters. The 27 SP2T switching devices are coupled via 108 cables represented by box 88 to the circular array of 108 radiating elements represented by box 89. Couplings of the 27 SP4T switching devices are as shown in FIG. 11. For a sampling of beam scan steps, power divider to radiating element couplings are listed in FIG. 12, with step 109 bringing the beam back to its zero step position. Basic scan stepping involves the following. The excited sub array includes 27 contiguous elements. For each step, the SP4T switch coupled to the left element is switched to the next position to the right and is connected to the right power divider. The center element is connected to the left power divider 82 and the signal available relative to that element is completely attenuated by the associated attenuator (as indicated by the center zero in the top line of data in FIG. 12, representing power divider ports). One divided power port of power divider 83 is terminated, so that there is an aggregate total of 27 divided power ports in active use. The arrangement enables each divided power port in use to be switched from one radiating element to another one displaced by 27 elements. Each element can be coupled to either power divider and the signal from any element can be completely attenuated.

Figure 13:
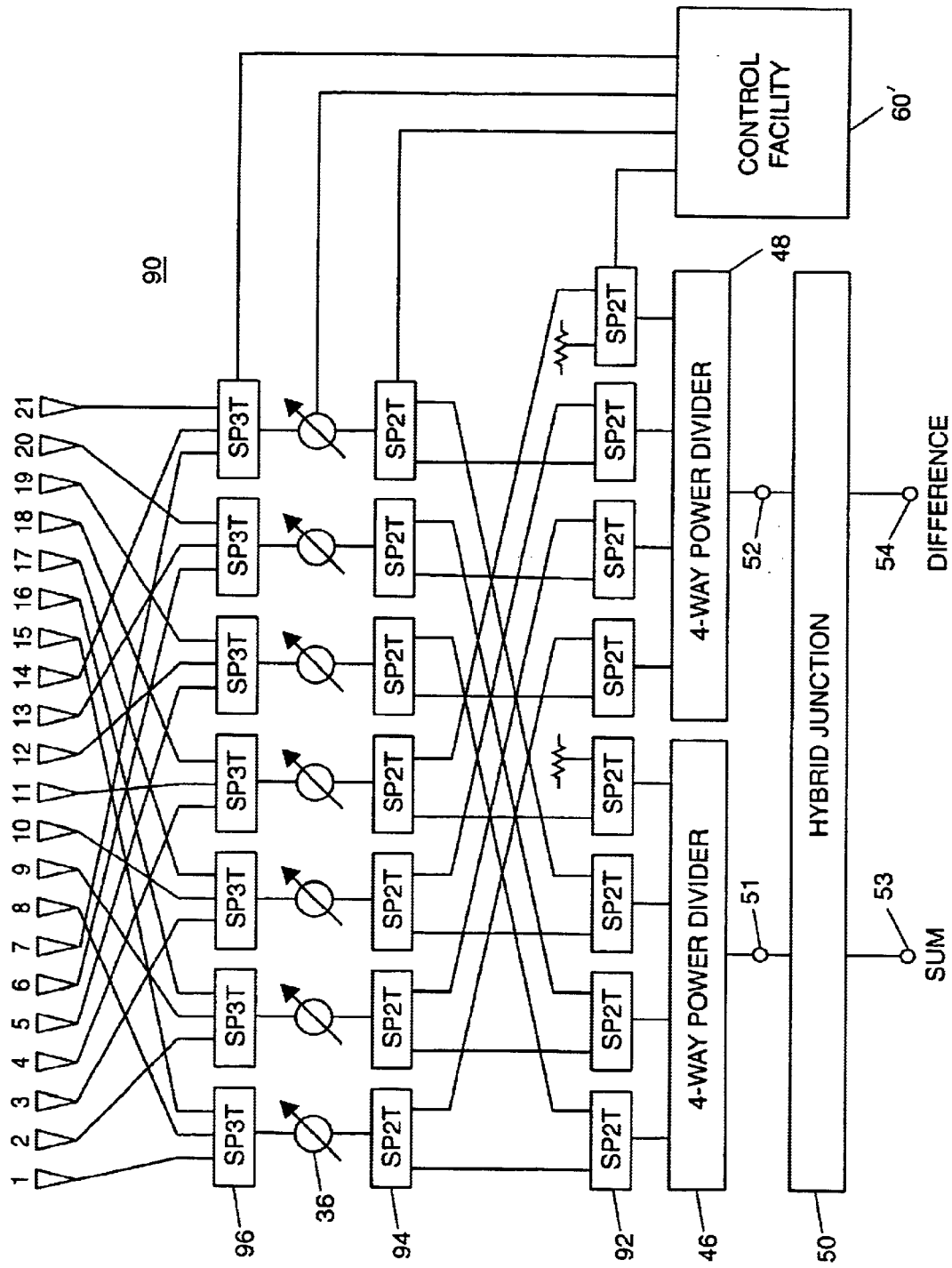
FIG. 13 illustrates a 21 element circular array version of the FIG. 10 array antenna, showing detail on simplified switched interconnections enabling continuous 360 degree scanning of a beam pattern with sum and difference excitation

With reference to the reduced or minimized switching network of antenna 80 described with reference to FIG. 10, FIG. 13 illustrates interconnections in the context of a 21 element array antenna 90, having seven element sub array scannable sum and difference excitation. As shown, in antenna 90 two 4-way power dividers 46 and 48 are coupled to eight SP2T switching devices, of which device 92 is representative. In this case, as to each of the power dividers, one of the coupled SP2T switching devices has one of its ports terminated. The eight SP2T switching devices represented by device 92 are coupled to seven additional SP2T switching devices, of which device 94 is representative. These seven SP2T switching devices are in turn coupled to a seven element excited sub array via phase shifters (e.g., shifter 36) and seven SP3T switching devices, of which device 96 is representative. Operationally, under the control of control facility 60' beam scan stepping is implemented using a protocol consistent with the power divider to radiating element couplings listed in FIG. 12 for the FIG. 10 array antenna. In this example, the signal available at the center radiating element of the seven element sub array is completely attenuated. Thus, all seven elements of the sub array are used for signal transmission, however signals from only the outer six elements are used during reception.

On an overview comparison basis, it will be seen that the switching network of antenna 90 is of reduced complexity, as compared to that of antenna 40 of FIG. 4. While the numbers of radiating elements in total and in the excited sub array are not the same in the two antennas, they are relatively similar. Thus, depending upon the specific application and other factors, a configuration of the type shown in FIG. 13 may provide advantages in some applications, while a configuration of the type shown in FIG. 4 may be preferable in other applications.

While there have been described the currently preferred embodiments of the invention, those skilled in the art will recognize that other and further modifications may be made without departing from the invention and it is intended to claim all modifications and variations as fall within the scope of the invention.

What is claimed is:

1. An array antenna, with scannable beam sum and difference excitation, comprising:

a circular array of radiating elements arranged to provide a beam pattern outward from the array circumference upon excitation of a sub array consisting of a fixed even number of contiguous radiating elements of said array;

a first power divider having a first port and a number of divided power ports equal to one-half of said fixed even number;

a second power divider having a first port and a number of divided power ports equal to one-half of said fixed even number;

a circuit device, coupled to said first ports and arranged to provide at a sum port a signal representative of a sum of signals from said power dividers and at a difference port a signal representative of a difference between signals from said first power divider and signals from said second power divider;

switching devices coupled between the radiating elements and said divided power ports of the first and second power dividers and arranged to provide said beam pattern by coupling the first and second power dividers to respective left and right subsets of a first said sub array of the radiating elements; and a control facility arranged to control said switching devices to scan said beam pattern by coupling said power dividers to a successive said sub array modified from said first sub array by initiating coupling to a radiating element contiguous in a forward beam scan direction and terminating coupling to the trailing radiating element of said first sub array, with the first and second power dividers coupled to respective left and right subsets of said successive sub array.

2. An array antenna as in claim 1, wherein said control facility is arranged to provide continuing 360 degree scanning of the beam pattern by coupling said power dividers to further successive said sub arrays, each modified from the preceding said sub array.

3. An array antenna as in claim 1, wherein said switching devices are arranged to enable each of said first and second power dividers to be connected to each of said radiating elements of said array.

4. An array antenna as in claim 1, wherein said switching devices are arranged to enable coupling of said power dividers to a successive said sub array by activation of only two switching devices.

5. An array antenna as in claim 1, wherein said array of radiating elements consists of 24 radiating elements, said sub array consists of any 8 contiguous radiating elements of said array, and each said subset consists of 4 contiguous radiating elements of a said sub array.

6. An array antenna as in claim 1, wherein said switching devices include a plurality of first switching devices, each coupled to one of said divided power ports.

7. An array antenna as in claim 6, wherein said switching devices further include a plurality of second switching devices, each coupled to one radiating element of said array and arranged to selectively connect one of two of said first switching devices to said one radiating element.

8. An array antenna as in claim 6, wherein the total number of radiating elements in said array, divided by said fixed even number of radiating elements in a sub array is an integer, and each said first switching device is configured to selectively connect one said divided power port to any one of a number of radiating elements equal to twice said integer.

9. An array antenna as in claim 1, additionally comprising:

a plurality of phase shifters, one coupled to each said divided power port.

10. An array antenna, with scannable beam sum and difference excitation, comprising:

a circular array of radiating elements arranged to provide a beam pattern outward from the array circumference upon excitation of radiating elements of a sub array consisting of a fixed number of radiating elements of said array;

a first power divider having a first port and a plurality of divided power ports;

a second power divider having a first port and a plurality of divided power ports;

a circuit device, coupled to said first ports of the first and second power dividers and arranged to provide at a sum port a signal representative of a sum of signals from said power dividers and at a difference port a signal representative of a difference between signals from said first power divider and signals from said second power divider;

switching devices coupled between the radiating elements and said divided power ports of the first and second power dividers and arranged to provide said beam pattern by coupling the first and second power dividers to respective first left and first right subsets of a said sub array of the radiating elements; and a control facility arranged to control said switching devices to scan said beam pattern by coupling the first power divider to a successive left subset of the radiating elements and the second power divider to a successive right subset of the radiating elements, said successive left subset including at least one radiating element not included in said first left subset and said successive right subset including at least one radiating element not included in the first right subset.

11. An array antenna as in claim 10, wherein said control facility is arranged to provide continuing 360 degree scanning of the beam pattern by coupling said power dividers to further successive left and right subsets.

12. An array antenna as in claim 10, wherein said switching devices are arranged to enable each of said first and second power dividers to be coupled to each of said radiating elements of said array.

13. An array antenna as in claim 10, wherein said switching devices are arranged to enable coupling of said power dividers to successive left and right subsets of the radiating elements by activation of only two switching devices.

14. An array antenna as in claim 10, wherein the total number of radiating elements in said array, divided by said fixed number of radiating elements in a sub array is not an integer.

15. An array antenna as in claim 14, wherein each of said first left and first right subsets consists of a contiguous group of one-half of the radiating elements of said sub array.

16. An array antenna as in claim 14, wherein the control facility is arranged to control said switching devices to provide fly-back switching at the end of a scan stepping cycle, to couple the first and second power dividers to the same radiating elements to which they were respectively coupled at the start of said scan stepping cycle.

17. An array antenna as in claim 10, wherein said fixed number of radiating elements in a sub array is an odd number.

18. An array antenna as in claim 10, wherein the total number of radiating elements in said array, divided by said fixed number of radiating elements in a sub array is an integer.

19. An array antenna as in claim 10, wherein said fixed number of radiating elements in a sub array is an odd number, said power dividers have an aggregate total number of divided power ports equal to said odd number plus one, said switching devices include a plurality of first switching devices each coupled to one of said divided power ports, each said first switching device has two switched ports, and for each power divider one of the first switching devices coupled thereto has one switched port terminated and not coupled to a radiating element.

20. An array antenna as in claim 19, wherein said switching devices further include a number of second switching devices equal to said odd number of sub array radiating elements, each said second switching device coupled to two of the non-terminated switched ports of said first switching devices.

21. An array antenna, with scannable beam sum and difference excitation, comprising:

an array of radiating elements arranged to provide a beam pattern upon excitation of a sub array consisting of a fixed number of radiating elements of said array;

a first power divider;

a second power divider;

a circuit device, coupled to said first and second power dividers and arranged to provide at a sum port a signal representative of a sum of signals from said power dividers and at a difference port a signal representative of a difference between signals from said first power divider and signals from said second power divider;

switching devices coupled between the radiating elements and the first and second power dividers and arranged to provide said beam pattern by coupling the first and second power dividers to respective left and right subsets of a first said sub array of the radiating elements; and a control facility arranged to control said switching devices to scan said beam pattern by coupling the first power divider to a left subset and the second power divider to a right subset, of radiating elements of a successive sub array including at least one radiating element not included in said first sub array.

22. An array antenna as in claim 21, wherein said switching devices are arranged to enable each of said first and second power dividers to be coupled to each of said radiating elements of said array.

23. An array antenna as in claim 21, wherein said switching devices are arranged to enable coupling of said power dividers to successive left and right subsets of the radiating elements by activation of only two switching devices.

24. An array antenna as in claim 21, wherein said successive sub array is modified from said first sub array by initiating coupling to a radiating element contiguous in a forward beam scan direction and terminating coupling to the trailing radiating element of said first sub array.

25. An array antenna as in claim 21, wherein the control facility is arranged to retain in said successive sub array all radiating elements of said first sub array, while newly including the contiguous radiating in a forward beam scan direction and excluding the trailing radiating element of said first sub array.

26. An array antenna as in claim 21, wherein said array is a circular array.

27. An array antenna, with scannable beam excitation, comprising:

a circular array of radiating elements arranged to provide a beam pattern outward from the array circumference upon excitation of a sub array consisting of a fixed number of radiating elements of said array;

a power divider having a first port and a number of divided power ports equal to said fixed number;

switching devices coupled between the radiating elements and the power divider and arranged to provide said beam pattern by coupling the power divider to said sub array of the radiating elements; and a control facility arranged to control said switching devices to scan said beam pattern by coupling the power divider to successive said sub arrays, each modified from the preceding sub array by initiating coupling to a radiating element contiguous in a forward beam scan direction and terminating coupling to the trailing radiating element of the preceding sub array, to enable continuous 360 degree scanning;

said switching devices arranged to enable coupling of said power divider to successive sub arrays of the radiating elements by activation of only one switching device.

28. As array antenna as in claim 27, wherein said control facility is arranged to retain in said successive sub arrays all radiating elements of the preceding sub array, while newly including said contiguous radiating element and excluding said trailing radiating element.

29. An array antenna as in claim 27, wherein the total number of radiating elements in said array, divided by said fixed member of radiating elements in a said sub array is an integer.

30. An array antenna as in claim 29, wherein said switching devices comprise a number of switching devices equal to the number of radiating elements in a said sub array and each switching device includes a port coupled to a divided power port of said power divider and a number of switched ports equal to said integer, with each switched port coupled to a different radiating element of said array.

* * * * *